United States Patent [19]
Croslin

[11] 3,975,960
[45] Aug. 24, 1976

[54] MANUAL FLUID SAMPLER WITH OVERSTROKE

[75] Inventor: Michael E. Croslin, Forest Hills Gardens, N.Y.

[73] Assignee: Technicon Instruments Corporation, Tarrytown, N.Y.

[22] Filed: Mar. 15, 1974

[21] Appl. No.: 451,538

[52] U.S. Cl............................. 73/425.6; 222/309
[51] Int. Cl.²..................... G01N 1/14; G01F 11/06
[58] Field of Search ................ 73/425.4 P, 425.6; 128/DIG. 5; 222/43, 250, 309

[56] References Cited
UNITED STATES PATENTS

| | | | |
|---|---|---|---|
| 2,458,508 | 1/1949 | Goetz............................ | 73/425.6 X |
| 2,487,825 | 11/1949 | Olvis............................. | 222/43 |
| 2,660,342 | 11/1953 | Ruf................................ | 73/425.6 X |
| 3,097,763 | 7/1963 | Aluotto........................ | 222/43 |
| 3,491,919 | 1/1970 | Ramsay....................... | 222/309 |
| 3,656,351 | 4/1972 | Raczak........................ | 73/425.6 |
| 3,713,774 | 1/1973 | Southwick.................. | 73/425.6 X |
| 3,786,683 | 1/1974 | Berman et al.............. | 73/425.6 X |
| 3,810,391 | 5/1974 | Suovaniemi................. | 73/425.6 |

*Primary Examiner*—Richard C. Queisser
*Assistant Examiner*—John S. Appleman
*Attorney, Agent, or Firm*—S. P. Tedesco; Stephen E. Rockwell

[57] ABSTRACT

A fluid sampler which may be held in the hand in the manner of a pencil is provided with an overstroke so that after a plunger is operated with a certain stroke to sample a determinable amount of fluid, the plunger can then be operated with an overstroke to make certain that all fluid is discharged from the sampler. The stroke of the plunger is furthermore adjustable. The sampler is provided with a longitudinally extended portable body provided with a bore extending longitudinally therethrough. A nozzle is provided at one end of the bore within which is a chamber. A plunger is located partly in the chamber and partly in the bore with a piston being operatively associated with the plunger and slidable in the bore. An adjustable control is provided in the bore to adjust the stroke of the piston. A lever is mounted on the body to operate the plunger through the intermediary of the piston whereby fluid may be drawn into or discharged from the aforementioned chamber. A stroke-and-overstroke arrangement is operatively coupled with the lever to cooperate with the control to define the limits of a stroke for the piston for the sampling of a fluid and to enable an overstroke of the piston upon discharge of the fluid thus to insure the complete discharge of the fluid. The stroke and overstroke arrangement includes a spring-loaded sphere yieldably engaging a detent in the lever when the lever is intermediate the limits of its movement.

17 Claims, 3 Drawing Figures

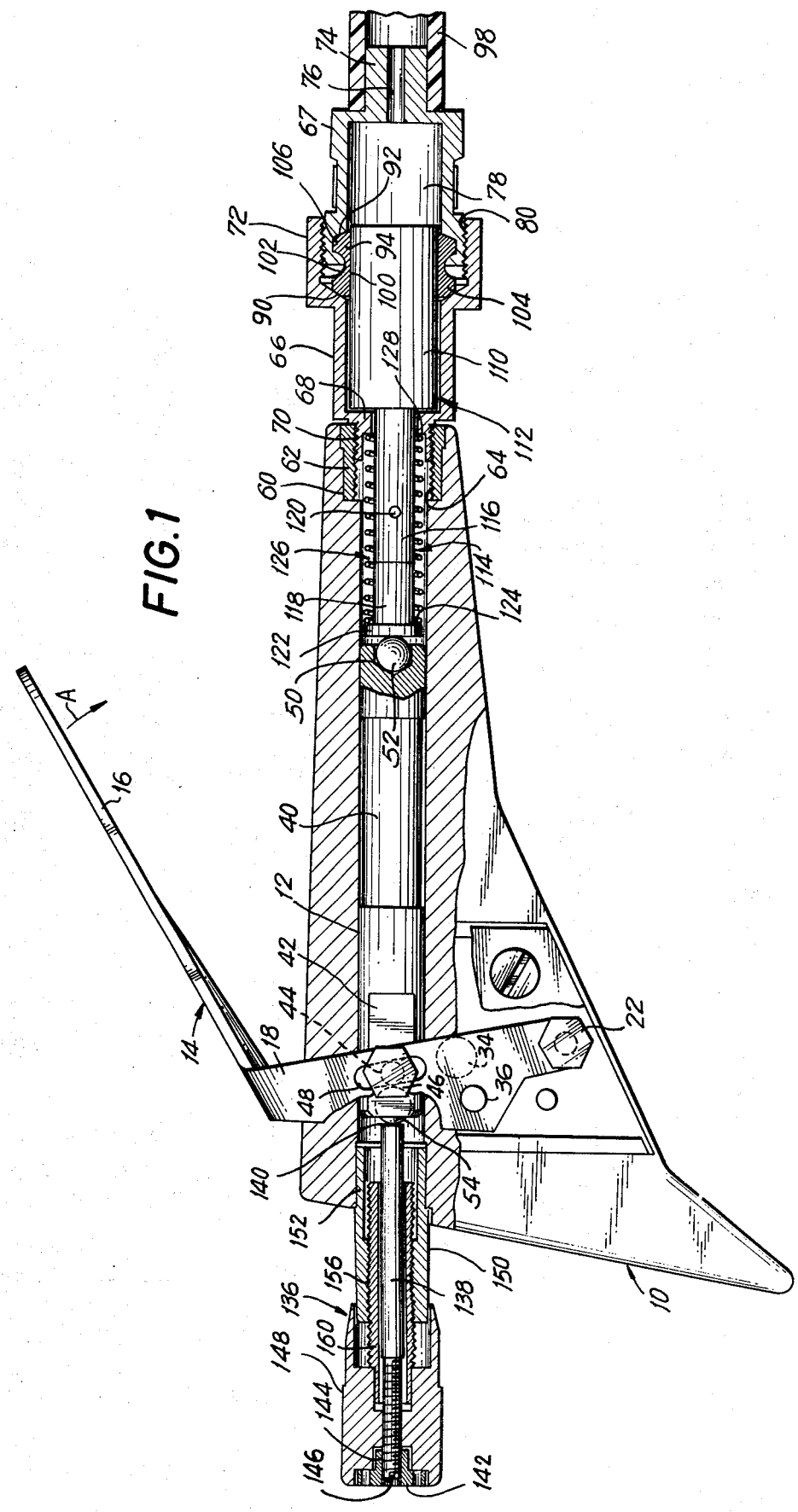

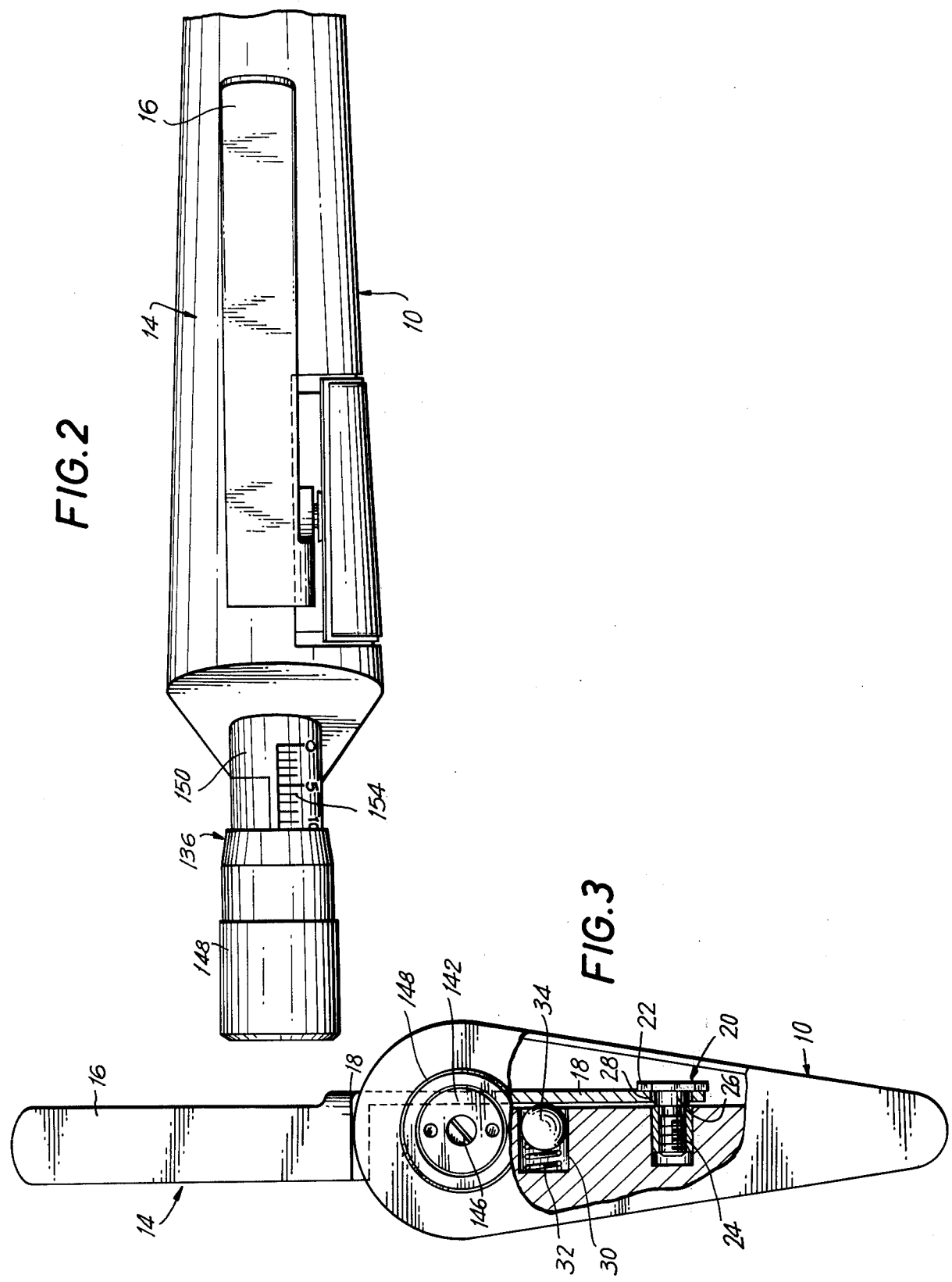

MANUAL FLUID SAMPLER WITH OVERSTROKE

BACKGROUND

One way of analyzing a fluid such as blood or serum is to draw the fluid into an element such as an inert container in a predetermined amount and subsequently to divide this sample into accurately determined sections which are discharged into other containers. Such analyzing tecniques depend to a very great extent upon the drawing of the correct amount of the fluid being analyzed into an additional container and the dispensing of the same into, for example, a new diluent.

Methods for drawing up fluids or pipetting the same are shown, for exampe, in earlier U.S. Pat. Nos. 3,244,324; 3,665,980; and in my earlier copending application Ser. No. 307,360, filed Nov. 17, 1972 which has already been allowed.

In U.S. Pat. No. 3,244,324 is disclosed a pipetting apparatus including an inlet conduit adapted for the supply of fluid with a chamber being arranged approximate the inlet conduit. The chamber is in the form of a tube having a bore of predetermined size and having two oppositely disposed ends. A scale device is operatively associated with the chamber intermediate the aforementioned ends and a first cap member is provided on one end of the tube sealing the same. A free piston is provided in the tube and has a size corresponding to that of the bore, the piston being slidable in the bore and dividing the chamber into two sections in substantially fluid tight manner. An adjustment means is provided on and seals the other end of the tube and includes a stop within the chamber which is adjustable relative to the scale means. An outlet conduit is coupled by two further conduits to the aforementioned tube proximate the ends of the same. As can be seen from the drawing of this patent, the apparatus provided is a volumetric dispensing apparatus which is not portable nor manually manipulable nor is any special provision made for the thorough purging of the bore in which the fluid is accumulated and subsequently dispensed.

Patents relating to the subject matter of U.S. Pat. No. 3,244,324 include the following U.S. Pat. Nos: 813,977; 1,188,085; 1,280,481; 1,784,892; 2,158,102; 2,406,239; 2,559,317; 2,576,747; 2,869,575; 3,138,290 and 3,138,294. These patents do not take care of the matters specifically raised hereinabove.

U.S. Pat. No. 3,665,980 describes a more sophisticated type of apparatus involving electronic control circuits. In this patent is disclosed a dispensing apparatus having various modes of operation including automatic, manual and prime modes. The dispensing apparatus includes coarse and fine metering devices consisting of cylinders with pistons displaceable therein. The displacement of the pistons is controlled by adjustable switches. The metering devices are associated with dispensing nozzles beneath which a tray is incrementally moved in which are receptacles for vials and the like. Although this apparatus provides for a priming mode, there is no particular arrangement made for thoroughly purging needed amounts of fluid from the cylinders in which these amounts are collected.

Other patents relating to this last mentioned structure include the following U.S. Pat. Nos: 1,739,252; 2,220,707; 2,658,644; 3,275,042; 3,364,759; 3,447,576; 3,525,592 and 3,536,449. These patents similarly do not deal with the limitations of the aforementioned structure.

Finally, my earlier copending application Ser. No. 307,360 discloses a pipette provided with an adjustable dispensing volume and with a control which makes the selected volume effective for repeated dispensing operations or for a one shot operation. A glass vial is associated with intake and dispensing valves and a piston is inserted therein. The vial or tube is encircled by a sheath connected with the piston and having a flange engaged by an adjustable stop which engages a flange on the sheath and limits the withdrawal of the piston from the tube and hence the fluid intake. It therefore limits the amount of fluid dispensed on the next sequential movement of the piston into the tube. This apparatus is however not particularly portable and no special provision is made for purging the receptacle into which the metered fluid is withdrawn during the next discharging operation.

The patents mentioned as having relevance to the last mentioned structure include the following U.S. Pat. Nos: 2,096,461; 2,198,666; 3,337,096, 2,548,752 and 2,605,019.

SUMMARY OF INVENTION

It is an object of my invention to provide an improved sampling and/or pipetting device.

It is another object of my invention to provide an improved sampling device adapted for sampling a fluid and which is of a simple and durable construction and which is furthermore relatively simple to operate.

It is still another object of the invention to provide an improved sampling device which enables the controlling of the volume of fluid being sampled and which is adjustable to provide for different volumes of fluid sampling.

A further object of the invention is to provide for enabling a sampled fluid to be divided into different amounts to be dispensed and which will store the fluid before it is dispensed in a stable and non-corrosive environment.

Still another object of the invention is to provide an improved device having interchangeable parts that will alter its range over a wide magnitude of volumes.

Still another object of the invention is to provide an improved sampling device which can be held by the operator in the same manner as one normally holds a pencil or other writing implement and of a form which may be cradled confortably in the operator's hand to thus assist in guaranteeing accurate dispensing.

In achieving the above and other objects of the invention, there is provided a fluid sampler comprising a longitudinally extended portable body provided with a bore extending longitudinally therethrough, a nozzle means being provided at one end of the bore and being provided with a chamber, the nozzle means including a nozzle through which to communicate with the chamber, there being furthermore provided a plunger located partly in the chamber and partly in the bore, a piston slidable in the bore, control means in said bore to adjust the stroke of the piston, and a lever mounted on the body to operate the plunger through the intermediary of the piston whereby a fluid may be drawn into or discharged from the chamber.

According to a particularly advantageous aspect of the invention, the body may be generally of pistol shape and the lever may extend externally of the body for manual manipulation. Furthermore, there may be provided a slide and slot means coupling the lever to the piston. Still further, the lever may include two angularly related parts, one of which extends generally transversly of the aforesaid bore and the other of which extends generally perallel to the bore.

The aforesaid nozzle means may include two threadably engaged parts in accordance with one embodiment of the invention. One of these threadably engaged parts threadably engages in the body and the other supports the nozzle in coaxial relationship with the bore. The nozzle means parts cooperatively define the aforesaid chamber in extension of the abovementioned bore and located between the bore and the nozzle. The nozzle means parts according to a particularly advantageous feature of the invention may include internal shoulders in facing and spaced relationship and an O-ring sandwiched between the shoulders. The O-ring may preferably be of Teflon. Moreover the O-ring may define a cylindrical inner passage for engaging the plunger and supporting the same while the O-ring may be further provided with an exterior annular groove dividing the O-ring into two generally equal sections. These sections may, for example, be preferably of generally trapezoidal cross-section.

The above noted plunger may include an enlarged first part in the chamber and a second part of smaller diameter in the bore. The second part may include two sections in longitudinal extension of each other, one of the two sections being connected to the enlarged first part and the other of the two sections including an enlarged ring. The sampler may furthermore include a helical spring encircling the second part and bearing against the aforesaid ring.

The above mentioned piston may be preferably a generally cylindrical member including a lateral flat section along which engagement is made with the lever.

According to a further feature of the invention, spherical elements or ballbearings may be provided in opposite extremities of the piston to provide point contact with the plunger and control means.

In addition to the above, the aforementioned control means may include a cylindrical part extending partly into the bore.

According to yet another particularly advantageous feature of the invention, there may be provided a stroke-and-overstroke means operatively coupled to the lever to cooperate with the control means to define the limits of a stroke for the piston for the sampling of a fluid and to enable an overstroke of the piston upon discharge of the fluid whereby to insure the complete discharge of the fluid.

According to still another feature of the invention, provision may be made for the use of a disposable tip upon the nozzle for the collection of fluid.

According to stil another advantageous feature of the invention, there may be provided a micrometer means controlling the cylindrical part.

The above and other objects, features and advantages of the invention will be found in the detailed description with follows hereinafter.

BRIEF DESCRIPTION OF DRAWING

FIG. 1 is a side view partly in section and partly broken away of a fluid sampling device provided in accordance with one embodiment of the invention;

FIG. 2 is a top view of a major portion of the sampling device illustrated in FIG. 1; and FIG. 3 is a front view partially broken away and partly in hidden lines of the sampling device of FIGS. 1 and 2.

DETAILED DESCRIPTION

According to the invention there is provided a fluid sampler comprising a longitudinally extended portable body provided with a bore extending longitudinally therethrough. A nozzle means is provided at one end of the bore and is provided with a chamber. The nozzle means includes a nozzle through which to communicate with the chamber. A plunger is lcoated partly in the chamber and partly in the bore there being furthermore a piston slidable in the bore with a control means in the bore to adjust the stroke of the piston. A lever is mounted on the body to operate the plunger through the intermediary of the piston whereby a fluid may be drawn into or discharged from the abovementioned chamber.

In the drawing there is generally indicated at 10 a body which may be fabricated of metal or plastic and which is generally pistol shaped and adapted for being grasped in a hand of the operator in the same manner that a pen or pencil or other like writing instrument is manipulated.

The body 10 is provided with a shape which is generally longitudinally extended and is furthermore provided with a bore 12 extending longitudinally therethrough. The body 10 is moreover provided with a lever 14 preferably fabricated of a wear-resistant material such as stainless steel and generally including two angularly related parts 16 and 18. The part 16 in a general sense extends longitudinally along the bore 12 whereas the part 18 extends in a general sense traversely of said bore.

The part 18 of the lever 14 is pivotally connected to the body 10 by means of a pin or bolt 20 having a hexagonal head 22, a threaded section 24 for engaging in a threaded receptacle provided in the body 10 and a cylindrical portion 26 connected between the threaded part 24 and the hexagonal head 22 to provide a bearing surface for the part 18 of the lever, the part 18 being provided a circular opering 28 for engaging around the cylindrical part 26.

In addition to the aforesaid, a cylindrical receptacle 30 is provided in the body 10. This receptacle accommodates a helical spring 32 and a ball or sphere 34 preferably, for example, a stainless steel ballbearing which is adapted to engage in a detent 36 for a purpose to be described in greater detail hereinafter. It should be noted, however, that the sphere 34 engages the part 18 of the lever 14 in such a manner as to permit a travel of the lever beyond the engagement of the sphere and detent and, it is further to be noted, that these parts are preferably of wear-resistant materials such as stainless steel to afford a multitude of operations of the lever without any substantially wear being effected.

In the bore 12 is accommodated a piston 40. The piston 40 is generally of cylindrical shape as is the bore in which it is accommodated. The piston may, for example, be fabricated of plastic or of a metal which will cooperate in wear-resistant manner with the body in which it is accommodated.

The piston 40 is provided with a generally flat lateral face 42 for making planer contact with a lateral face of the part 18 of the lever 14. A pivotal slot type connection is provided between the piston 40 and the lever 14 through the intermediary of a pin 44 which is threaded into a threaded receptacle in the flat face 42 by operation of hexagonal head 46 connected to the pin 44. The pin 44 is moreover accommodated in an elongated slot 48 provided in the lever 14 in order to provide a pin and slot connection between the lever and the piston whereby a longitudinal or axial displacement may be given to the piston without exerting any transverse force thereupon.

In addition to the aforesaid, the piston 40 is furthermore provided with receptacles such as indicated at 50 for accommodating at the ends of the piston two respective ballbearings 52 and 54. The purpose of these ballbearings or spheres is to enable the piston to make a point contact with the objects which it is intended to contact without imparting any lateral thrust either to the piston or to the parts to be contacted.

At the end of the bore 12 which is disposed at the front or nose of the body 10 is provided an enlarged opening 60 in which is accommodated a sleeve 62 provided with an interior thread indicated at 64. This sleeve accommodates a nozzle arrangement as next described in greater detail hereinafter.

More specifically, the nozzle arrangement consists of parts 66 and 67 whereof the part 66 includes an axial extension 68 having an external thread 70 adapted to penetrate into and engage the thread 64 of the sleeve 60. Moreover, it will be noted that the part 66 includes an annular ring 72 which is of greater diameter than the main section of the part 66.

As to the part 67, it bears a nozzle or tip 74 having an opening 76 which is in concentric relationship with the chamber 78 defined by the parts 66 and 67 and is as well in concentric relationship with the bore 12. The chamber 78 and the opening 76 are generally in longitudinal extension of the bore 12.

Part 67 is moreover provided with an external thread indicated generally at 80 and adapted to penetrate into and threadably engage a threaded receptacle provided within the ring 72.

The part 66 on the one hand and the part 67 on the other hand are provided with two internal spaced and facing shoulders 90 and 92. The function of the shoulders 90 and 92 is to provide a trapping for the annular ring 94 which collapses and forms a seal upon the threading together of the parts 67 and 66. This generally provides for ready replacement of the parts 67 and/or 66 so that the volume of the chamber 78 can be readily adjusted by providing a series of replaceable parts which provide for a different range of volumes such as, for example, the following collectively available ranges:

4 – 10 $\mu$l
8 – 20 $\mu$l
20 – 50 $\mu$l
40 – 100 $\mu$l
80 – 200 $\mu$l
200 – 500 $\mu$l
400 – 1000 $\mu$l.

This is just an example of the different types of ranges which are possible and the listing can be extended infinitely.

The nozzle 74 is adapted to accommodate thereon any of the commercially available tips such as indicated by way of example at 98. These tips are generally of a stable and inert material which will not react with the fluid to be sampled and which, for example, may be inexpensive so as to be disposable without economic hardship. It should be noted that generally the fluid to be sampled will only preferably come into the disposable tip 98 and is not generally intended to be drawn into the chamber 78.

Referring again to the annulus or O-ring 94, it will be seen that this has an interior surface which is indicated at 100 and is generally cylindrical in shape to cooperate with a plunger as will be described hereinafter. The ring 94 is preferably fabricated of a material of low friction which is capable of being collapsed and may be, for example, fabricated of Teflon.

The ring is preferably provided with an exterior annular channel 102 which divides the ring into two sections 104 and 106 which may be generally trapezoidal in shape. The outer surfaces of the trapezoidal sections 104 and 106 bear against the shoulders 90 and 92 of parts 66 and 67 and the annular groove 102 enables the ring to collapse to provide an airtight seal which prevents any leakage in the operation of the sampler as will be described more fully hereinafter.

Within the chamber 72 is accommodated the enlarged part 110 of a plunger indicated generally at 112. Attached to the enlarged part 110 is a longitudinal or axial extension indicated generally at 114 and consisting of parts 116 and 118 which are longitudinal extensions of one another. The part 116 is affixed rigidly and monolithically to the enlarged part 110 whereas the part 118 may be detachably and threadably engaged with the part 116 and fixed, for example, by means of a set screw 120.

At the free end of the part 118 is a ring 122 having a surface 124 constituting a bearing surface for one end of a helical spring indicated generally at 126. The other end of the helical spring 126 bears against a shoulder 128 provided on the part 68 of the part 66 of the nozzle arrangement.

As a result of the spring 116, the enlarged part 110 is normally urged to withdrawn position within the chamber 78.

At the opposite end of the bore 12 is provided a micrometer arrangement generally indicated at 136. It includes a cylindrical part 138 extending within the bore 12 concentrically aligned in the same. The cylindrical part 138 engages the ball 54 and makes point contact with the same. The end 140 of the part 138 provides a limit of the stroke of piston 40 as will be discussed in greater detail hereinafter.

Further, engagement is made between an extremity of the part 138 and the interior of a hexagonal nut 142, the further engagement being indicated generally at 144. This extremity of the cylindrical part 138 is provided with an adjustment slot 146 which provides a fixed type adjustment as between the cylindrical part 138 and the micrometer cap 148 Generally after initial adjustment is made of the cylinder 138, it is considered fixed relative to the micrometer cap 148.

As part of the micrometer arrangement 136, there is provided a cylinder 150 having a section 152 which is press-fit in the corresponding end of the bore 12. The cylindrical part 150 is provided with an index serving for micrometer adjustment and geneally indicated at 154 (FIG. 2).

The part 150 is moreover provided with a thread 156 which cooperates with a similar thread on the sleeve 160 which is provided with a bore through which extends the cylindrical part 138. This threaded engagement enables rotary motion of the micrometer cap 148 to adjust the penetration of cylindrical part 138 into the bore 12 in accurately controlled amounts which establish the location of the extremity 140 of the cylindrical part 138. At the same time, relative movement between the cap 148 and the sleeve 150 is observable on the index 154 so that the amount of adjustment can be visually controlled.

It will now be seen that the piston 40 has a stroke within the bore 12 which has one limit defined by engagement of the ball 54 with the extremity 140 of the cylindrical part 138 of the micrometer control. The length of the stroke of the piston is effected by manipulation of the lever 14 which makes a pin and slot engagement with the flat face 42 of the piston 40 as has been discussed hereinabove. During this operation in which the lever 14 is moved in the direction of the arrow indicated at A, the detent 36 in the part 18 of lever 14 is moved towards the ball 34. When the ball 34 engages in the detent 36 the desired length of stroke of the piston 40 has been effected for one of the purposes of the device. However, an overstroke is provided so that the lever can be moved beyond the position dictated by engagement of the ball and detent arrangement which has been noted. The reason for this is to permit an overstroke so that the chamber 78 can be thoroughly purged of air and so that the tip 98 connected to the nozzle 74 can be thoroughly purged of fluid which may have been accumulated therein in a prior operation. Thus the arrangement consisting in part of detent 36 and ball 34 constitutes a stroke-and-overstroke arrangement whereby a precisely metered amount of fluid may be drawn into the tip 98 and whereby the overstroke provides for completely purging the disposable tip 98 of fluid which has been accumulated therein. All of this is made possible by the use of a resiliently loaded member which gives an indication to the operator of when the normally desired and accurately measured stroke has been effected while such arrangement does not constitute an absolute block to further movement of the piston 40.

From what has been stated above, it will now be seen that there is provided in accordance with the invention a manually operable fluid sampler comprising a longitudinally extended portable body provided with a bore extending longitudinally therethrough with a nozzle means being provided at one end of the bore and being provided with a chamber as well as including a nozzle through which to communicate with the chamber. A plunger is located partly in the chamber and partly in the bore with a piston being slidably arranged in the bore and control means being arranged at the other end of the bore to adjust the stroke of the piston. A lever is mounted on the body to operate the plunger through the intermediary of the piston whereby a fluid may be drawn into or discharged from the chamber.

As has been indicated above the body is advantageously of generally pistol shape and the lever extends externally of the body for manual manipulation. A slide and slot means or arrangement is provided to couple the lever to the piston. The lever may preferably include two angularly related parts, one of which extends generally transversely of the bore and the other of which extends generally parallel to the bore.

The nozzle means in the preferred embodiment of the invention includes two threadably engaged parts, one of which threadably engages the body and the other of which supports the nozzle in coaxial relationship with the bore. The nozzle means parts cooperatively define the chamber as an extension of the bore and the chamber is located between the bore and the nozzle. The nozzle means parts include internal shoulders in facing and spaced relation and an O-ring is sandwiched between these shoulders. The O-ring is preferably of Teflon. Moreover, it defines a cylindrical inner passage for engaging the plunger and is furthermore provided with an exterior annular groove dividing the O-ring into two generally equal sections of trapezoidal cross-sections.

As has been described hereinabove, the plunger includes an enlarged first part in the chamber and a second part of smaller diameter in the bore. The second part includes two sections in longitudinal extension of each other and one of the sections being monolithically connected to the enlarged first part and the other of the two sections including an enlarged ring. The sampler furthermore includes a helical spring encircling the second part and bearing against the ring.

The aforenoted piston is a generally cylindrical member including a lateral flat sectional along which engagement is made with the lever. Advantageously, spherical elements may be included in opposite extremities of the above noted piston to provide point contact with the plunger and control means.

The control means may include a cylindrical part extending partly into the bore with a micrometer arrangement controlling the location of the cylindrical part.

According to a particularly important feature of the invention, there is provided a stroke-and-overstroke arrangement operatively coupled to the above mentioned lever to cooperate with the aforesaid control means to define the limits of a stroke for the piston for the sampling of a fluid and to enable an overstroke of the piston upon dishcarge of the fluid whereby to insure the complete discharge of the fluid.

A disposable tip may be generally employed on the nozzle for the collection of fluid and may be of a commercially available type.

Advantageously, the aforesaid stroke-and-overstroke arrangement includes a spring-loaded member in the body for yieldably engaging a detent in the lever when the lever is intermediate limits of its movement.

There will now be obvious to those skilled in the art many modifications and variations of the structural arrangement set forth herinabove. The modifications and variations will not, however depart from the scope of the invention as defined by the following claims.

What is claim is:

1. A fluid sampler comprising a longitudinallly extended, portable body provided with a bore extending longitudially therethrough, a nozzle means at one end of said bore and provided with a chamber, said nozzle means including a nozzle through which to communicate with said chamber, a plunger located partly in said chamber and partly in said bore, a piston slidable in said bore, control means at least partly in said bore to adjust the stroke of said piston, a lever mounted on said body to operate said plunger through the intermediary of said piston whereby a fluid may be drawn into or discharged from said chamber, stroke-and-overstroke means operatively coupled to said lever to cooperate with said control means to define the limits of a stroke for the piston for the sampling of a fluid and to enable an overstroke of the piston upon discharge of the fluid whereby to insure the complete discharge of the fluid, said stroke-and-overstroke means including a spring-loaded member in said body for yieldingly engaging a detent in said lever when the lever is intermediate limits of its movement.

2. A fluid sampler as claimed in claim 1 wherein said body is generally pistol shaped and said lever extends externally of said body for manual manipulation.

3. A fluid sampler as claimed in claim 1 wherein said nozzle means includes two threadably engaged parts one of which threadably engages said body and the other of which supports said nozzle in coaxial relation with said bore, the nozzle means parts cooperatively defining said chamber in extension of said bore and between the latter and said nozzle.

4. A fluid sampler as claimed in claim 3 wherein the nozzle means parts include internal shoulders in facing and spaced relation and an O-ring sandwiched between said shoulders.

5. A fluid sampler as claimed in claim 4 wherein said O-ring is of Teflon.

6. A fluid sampler as claimed in claim 4 wherein said O-ring defines a cylindrical inner passage for engaging said plunger, said O-ring being further provided with an exterior annular groove dividing the O-ring into two generally equal sections.

7. A fluid sampler as claimed in claim 6 wherein said sections are of generally trapezoidal cross-section.

8. A fluid sampler as claimed in claim 1 wherein said plunger includes an enlarged first part in said chamber and a second part of smaller diameter in said bore.

9. A fluid sampler as claimed in claim 8 wherein said second part includes two sections in longitudinal extension of each other, one of said two sections being connected to said enlarged first part and the other of said two sections including an enlarged ring, said sampler further including a helical spring encircling said second part and bearing against said ring.

10. A fluid sampler as claimed in claim 1 wherein said piston is a generally cylindrical member including a lateral flat section along which engagement is made with said lever.

11. A fluid sampler as claimed in claim 1 wherein said control means includes a cylindrical part extending partly into said bore.

12. A fluid sampler as claimed in claim 1 wherein said piston is separate from said plunger.

13. A fluid sampler as claimed in claim 1 wherein said member is a sphere.

14. A fluid sampler as claimed in claim 13 wherein the sphere and lever are of stainless steel.

15. A fluid sampler, comprising: an elongated body having a longitudinal cavity therein opening through a nozzle, plunger means in said cavity movable between fully retracted and fully extended positions, and an actuating means for said plunger means and including an operating member movably supporting from said body, said fully extended position being an overstroke position and said plunger means having an intermediate stroke position, said actuating means and said body having therebetween a biased catch member and coacting keeper to releasably latch said actuating member in said intermediate position of said plunger means.

16. A fluid sampler as defined in claim 15, further includng control means threaded on said body and extending into said cavity for engagement with said actuating means to adjust the stroke of said plunger means.

17. A fluid sampler as defined in claim 15, wherein: said body is hand-held and has a pistol grip portion, said operating member being a lever swingable on an axis transversely of said body.

* * * * *